United States Patent [19]

Bischoff et al.

[11] Patent Number: 4,622,882

[45] Date of Patent: Nov. 18, 1986

[54] VALVE DEVICE FOR VACUUM BRAKE BOOSTERS

[75] Inventors: Gilbert Bischoff; Reiner Müller, both of Hattersheim; Dietmar Gath, Braunfels, all of Fed. Rep. of Germany

[73] Assignee: ITT Industries, Inc., New York, N.Y.

[21] Appl. No.: 623,391

[22] Filed: Jun. 22, 1984

[30] Foreign Application Priority Data

Jun. 25, 1983 [DE] Fed. Rep. of Germany ....... 3322980

[51] Int. Cl.$^4$ ............................................. F15B 9/10
[52] U.S. Cl. ................... 91/369 R; 91/376 R
[58] Field of Search ............ 91/369 A, 369 B, 376 R, 91/369 R

[56] References Cited

U.S. PATENT DOCUMENTS

| | | | |
|---|---|---|---|
| 3,177,777 | 4/1965 | Kenrick | 91/376 R |
| 3,972,263 | 8/1976 | Welsh, Jr. | 91/369 A |
| 4,350,076 | 9/1982 | Thiel | 91/369 A |
| 4,363,259 | 12/1982 | Ohmi | 91/369 A |

*Primary Examiner*—Robert E. Garrett
*Attorney, Agent, or Firm*—James B. Raden; Donald J. Breh

[57] ABSTRACT

A valve device for a vacuum brake booster in which the poppet valve arranged in the bore of the control housing is held by means of a supporting ring provided with a radially inwardly extending flange. The flange holds a tubular part serving to hold and support of the valve spring which, on one end rests on the rear annular surface of the valve flange of the poppet valve and which, on the other side is supported on a collar of the piston rod. The valve spring has a cylindrical spring section and a conically shaped spring section, the length of the cylindrical section approximately corresponding to the length of the tubular part of the supporting ring.

4 Claims, 1 Drawing Figure

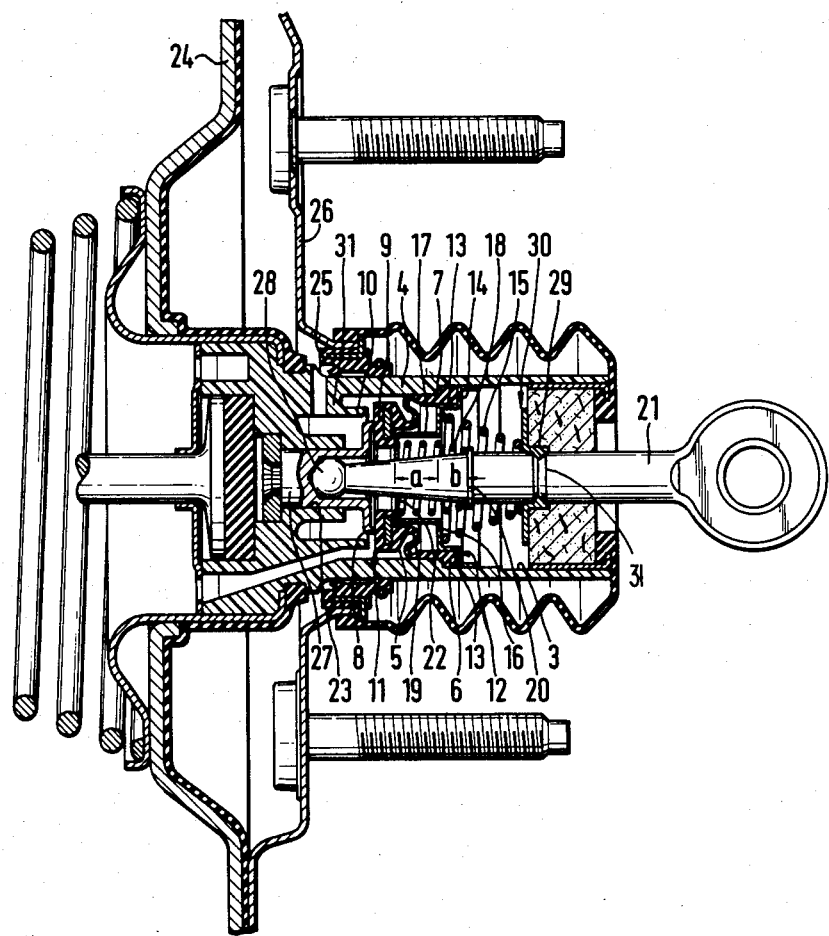

VALVE DEVICE FOR VACUUM BRAKE BOOSTERS

BACKGROUND OF THE INVENTION

This invention relates to a valve device for vacuum brake boosters of the type in which the pressure differential which becomes effective at a movable wall is controlled by a valve device provided within the bore of a control housing. The valve device has an annular flexible valve cone with an outer bead in sealing engagement with the bore of the control housing and which rests with its outer shoulder at the control housing. The valve cone has a radially inwardly extending valve flange which is biased by a valve spring to abut on a first valve seat arranged on a control piston movable by a piston rod. The valve flange upon movement of the control housing further cooperates with a second valve the seat of which is provided on a radially inwardly extending shoulder formed in the bore of the control housing. The valve device has a supporting ring provided with a cylindrical collar keeping the outer bead of the flexible valve cone in position at the control housing.

A valve device of the type in question is known from Laid-open German Patent Application-OS No. 1,601,707, in which the valve device has a reinforcing component. The reinforcing component has an annular member which keeps the outer mounting flange of the flexible valve body engaged with the wall and the outer shoulder of the bore. A flange bent upwardly is provided at the outer end of the annular member in order to accommodate the valve return spring. A flange directed angularly inwards is provided at the inner end of the annular member in order to accommodate and center the valve spring. One disadvantage among others of this known valve device lies in the differently proportioned forces with which the valve spring acts on the flexible cone valve, depending on the position in which the push rod for the actuation of the reaction piston is at each time. A further disadvantage lies in the fact that the valve return spring and the valve spring are arranged serially end to end so that the two springs altogether require the push rod to be comparatively long in order to accommodate them. This type of construction makes it difficult to configure a compact structure of the control housing and hence of the booster as a whole. Finally, the known design of the valve spring has the disadvantage that it does not exert any centering effect on the valve flange of the valve device and the valve spring itself tends to slip away when being compressed leading to leakages in the area of the valve seats.

SUMMARY OF THE INVENTION

It is therefore an object of the present invention to provide a valve device in which the sealing surface of the flexible valve cone (poppet valve) is not influenced by transverse forces of the valve spring, forces resulting from the deviation of the piston rod. Further, the sealing seats of the control piston and of the control housing always seal at the same point on the sealing surface of the valve cone, thus preventing the formation of impressions or grooves on the sealing surface after a prolonged period of operation which might lead to leakage of the valve device.

According to this invention the objects of the invention are achieved in that the valve device has a collar with a radially inwardly extending flange for the support of the piston rod return spring, with a tubular part being provided at the inner edge of the collar in order to support and center the valve spring, the tubular part extending in the axial direction towards the valve flange.

Preferably, the outwardly bent edge of the supporting ring and the bead are sealed relative to the wall of the control housing by means of the force the piston rod return spring exerts on the inwardly bent flange. The tubular part is preferably aligned to center the valve device and valve spring within the bore of the control housing to ensure the alignment of the sealing surface of the valve flange in respect of the valve seats.

Expediently, the valve spring has a cylindrical spring section and a conically shaped spring section, with the free end of the conically shaped spring section supported at a collar of the piston rod and the free end of the cylindrical section supported at the pedal-side annular surface of the valve flange.

BRIEF DESCRIPTION OF THE DRAWING

This invention is capable of being used in a plurality of embodiments, one of them being schematically represented in detail in the attached drawing which is a longitudinal partial section taken through the control housing of a brake booster.

DETAILED DESCRIPTION OF THE DRAWING

The drawing shows a section of a vacuum brake booster actuating and control device comprising a generally cylindrical control housing 4 accommodating a control piston 27 actuated by a piston rod 21, with the control housing 4 being connected with the movable wall 24 of the brake booster and supported in a sealed guide 25 within the housing 26 of the booster. The control piston 27 is displaceably held in a bore 23 of the control housing 4. Via a ball and socket joint 28, the control piston 27 is positively coupled to the piston rod 21 which protrudes from the control housing 4. The piston rod 21 carries a sleeve 29 whose end facing the control piston 27 has an annular collar for the formation of a spring plate 30. Supported on the spring plate 30 is one end of a piston rod return spring 15 whose other end is supported at a shoulder 7 of the control housing 4, with a supporting ring 12 and a bead 6 of the valve cone 5 being interposed. Further, between the piston rod return spring 15 and the control piston 27, a valve spring 18 is arranged on the piston rod 21. On the one end, the valve spring 18 is supported on a collar 20 of the piston rod 21 and, on the other end, it rests on the annular surface 22 of the valve cone 5. Depending on the operational condition of the braking device, the valve spring 18 will bring the valve cone 5 into engagement either with the valve seat of the control piston 27 or with a second valve seat 10 formed at the control housing 4.

The piston rod 21 has an annular groove for the fitting of the sleeve 29. By means of a pressing or squeezing tool, the sleeve 29 wall area lying opposite to the annular groove will be pressed at several points of its circumference into the groove so as to bring about a positive connection between the sleeve 29 and the piston rod 21.

When assembling the vacuum brake booster, first the sleeve 29, the piston rod return spring 15, the supporting ring 12 with the tubular part 17, the valve spring 18, and the valve are sequentially placed onto the control piston 27. Next, the piston rod 27 is connected positively with the end of the piston rod 21, the end being designed as a ball and socket or globe joint 28. The unit thus assembled is inserted with the control piston 27 facing downwards into a device which will align the components relative to one another and form an axial abutment for the control piston 27. The assembly device comprises several pressing tools arranged radially relative to the longitudinal axis of the piston rod 21 and essentially evenly spaced relative to one another. The ends of the tools rest radially outside of the sleeve 29, directly opposite to the annular groove. From the side averted from the control piston 27, the sleeve 29 is loaded by a predetermined force by means of a fork embracing the piston rod 21, the force being proportioned to corresponding to the required prestressing force of the piston rod return spring 15 in its assembled position. Thereby, the sleeve 29 will be displaced until the piston rod return spring 15 will have gained the required prestress. Thereupon, by applying the pressing tools, the wall of the sleeve 29 will be worked plastically into the annular groove and thus positively connected with the piston rod 21. The piston rod return spring 15 now has the required prestress, regardless of the existing dimensional tolerance. The preassembled unit including the piston rod 21 and the components connected therewith is inserted into the control housing 4 of the brake booster and is connected in the usual way with the brake booster.

As shown in the drawing, the valve spring 18 includes a cylindrical section "a" having its end winding, resting uniformly on the valve annular surface 22. The cylindrical section "a" extends along a substantial length of the opening to a location whereat the spring is provided with a conical section "b" tapering to a diameter such that it abuts the collar 20 on the piston rod. As shown in the drawing, the length of the cylindrical piston "a" of the valve spring 18 is substantially the same as the length of the tubular part 17 of the supporting ring 12, and, as also shown in the drawing, the outer diameter of the cylindrical portion "a" of the spring and is received against the diameter of the inner peripheral surface of the tubular part are dimensioned to support and restrain the spring radially along portion "a" under the influence of a transverse force on the spring. Although not a necessity, the outer peripherial surface of the tubular part 17 can be received against the poppet valve if desired providing further co-axial alignment of the poppet-valve cone 5 with the tubular part 17.

It is a special advantage of this valve device construction that the tubular part 17 co-axially aligns and supports the valve spring 18 relative to the valve seats 8 and 10, and physically restrains the valve spring against radial movement along the length of the cylindrical portion "a" in the event that a transverse force is imposed on the spring. In the absence of the tubular portion, transverse forces acting on the spring, which are developed as a result of deviation of the piston rod from a co-axial relationship with the valve spring 18 due to wear and the degree of pivotal motion imported to the piston rod (see the arrow in the drawing) as a result of its being connected to a pivotal brake pedal lever, which is not illustrated, would cause the valve spring to cock, tilt, bend, or move radially with respect to the valve annular portion 22, thereby resulting in a non-uniform distribution of force on the annular surface 22 and non-uniform compressive force between the valve seats 8, 10. The supporting and aligning tubular section 17 thereby assure uniform axial compression between the valve seats 8, 10 and the valve cone sealing surface 11 independently of transverse forces acting on the spring due to deviation of the piston rod from a co-axial relationship with the valve spring 18 and valve seats 8 and 10.

Further, the conical section "b" provides for accommodating both spring 15, 18 in the bore 3 of the control housing in a comparatively space-saving manner.

What is claimed is:

1. A valve device for use in a vacuum brake booster of the type having a movable wall operatively connected to a master cylinder and to a control valve device provided in a bore of a control housing for controlling pressure across said movable wall, said valve device including a flexible valve cone having an outer annular bead at one end and a radially inwardly extending valve flange at an end opposite said one end, a control piston co-axially aligned with said bore having one end thereof adjacent said valve flange defining a first valve seat, a second valve seat provided on a radially inwardly extending annular shoulder formed in the bore of the control housing disposed radially outwardly from said control piston and being adjacent said valve flange, a piston rod operatively connected at one end thereof to brake actuation means for movement between a brake released position and a fully braked position, said piston rod extending substantially co-axially through said bore, said piston rod having a second end connected to said valve piston, a support ring co-axially mounted in said bore including a cylindrical collar, said annular bead maintained in sealing engagement between the bore of said control housing and said collar of said support ring by a piston rod return spring co-axially surrounding said piston rod and operatively connected at one end thereof to said piston rod and abuting said collar at a second end thereof, a valve spring co-axially around said piston rod, co-axially aligned with said first and second valve seats having one end thereof operatively connected to said piston rod and a second end thereof abuting an annular surface of said cone valve flange and means providing for uniform axial compression and alignment of said valve spring independently of transverse forces imposed thereon due to deviation of said piston rod from said co-axial alignment relative to said valve spring, whereby uniform compressive force on said first and second valve seats is effected in all positions of said piston rod between said brake released position and said fully braked position.

2. A valve device as claimed in claim 1, wherein said means provide for uniform axial compression and alignment of said valve spring independently of transverse forces imposed thereon includes a straight, tubular portion of said support ring having a predetermined length and extending from said collar co-axially within said valve cone around said valve spring with one end of said tubular portion in close proximity to said annular surface of said cone valve flange said valve spring having a straight cylindrical section having a length of at least as long as said predetermined length of said tubular portion of said support ring, said valve spring disposed co-axially within said tubular portion with the outer diameter of said cylindrical section of said valve spring and the diameter of an inner cylindrical surface of said tubular member dimensioned to support and restrain said valve spring against radial movement along said cylindrical section under the influence of said transverse forces imposed thereon.

3. A valve device as claimed in claim 2 in which the valve spring has a conically shaped spring section having a free end supported at a collar of the piston rod.

4. A valve device for use in a vacuum brake booster of the type having a movable wall operatively connected to a master cylinder and to a control valve device provided in a bore of a control housing for controlling pressure across said movable wall, said valve device including a flexible valve cone having an outer annular bead at one end and a radially inwardly extending valve flange at an end opposite said one end a control piston co-axially aligned with said bore having one end thereof adjacent said valve flange defining a first valve seat, a second valve seat provided on a radially inwardly extending annular shoulder formed in the bore of the control housing disposed radially outwardly from said control piston and being adjacent said valve flange, a piston rod operatively connected at one end thereof to brake actuation means for movement between a brake released position and a fully braked position, said piston rod extending co-axially through said bore, said piston rod having a second end connected to said valve piston, a support ring co-axially mounted in said bore including a cylindrical collar having an outwardly bent edge, said annular bead in sealing engagement between a shoulder on said control housing within said bore and said edge, said support ring further including a radially, inwardly extending flange and a cylindrical tubular section extending co-axially in said bore from said support ring flange having an end thereof adjacent an annular surface on said valve cone flange, a piston rod return spring having one end thereof abutting said radially inwardly extending flange of said support ring and a second end thereof operatively connected to said piston rod, a valve spring around said piston rod co-axially aligned with said bore and said first and second valve seats having one end thereof against said annular surface of said cone flange and a second end thereof operatively connected to said piston rod, said valve spring including a cylindrical portion along portion of its length substantially equal to the length of said tubular section of said support ring, said cylindrical protion of said spring having an outer diameter and said tubular section having an inner diameter, said outer and said inner diameters providing for restraint of the cylindrical portion of said spring against radial movement under the influence of a transverse force imposed thereon.

* * * * *